United States Patent [19]

Drutchas, deceased et al.

[11] Patent Number: 4,751,978

[45] Date of Patent: Jun. 21, 1988

[54] ELECTRIC ASSIST STEERING SYSTEM WITH ALTERNATOR POWER SOURCE

[75] Inventors: Gilbert H. Drutchas, deceased, late of Birmingham, by Elaine M. Drutchas, legal representative; John S. Borza, Sterling Heights, all of Mich.

[73] Assignee: TRW Inc., Cleveland, Ohio

[21] Appl. No.: 26,400

[22] Filed: Mar. 16, 1987

[51] Int. Cl.⁴ .............................................. B62D 5/04
[52] U.S. Cl. .................... 180/142; 180/79.1; 318/158
[58] Field of Search ............... 180/142, 141, 143, 133, 180/79.1; 318/158

[56] References Cited

U.S. PATENT DOCUMENTS

| 2,531,061 | 1/1946 | Le Torneau | 318/158 |
|---|---|---|---|
| 2,754,465 | 6/1952 | Brier | 180/79.1 |
| 2,842,039 | 5/1950 | Swingle | 318/158 |
| 3,246,633 | 3/1962 | Rowe | 318/158 |
| 3,436,163 | 4/1969 | Hemmenway | 318/158 |
| 3,938,953 | 10/1976 | Bayle | 180/79.1 |
| 3,954,147 | 5/1976 | Hollins | 180/133 |
| 4,323,830 | 4/1982 | Belsterling | 318/158 |
| 4,415,054 | 11/1983 | Drutchas | 180/79.1 |
| 4,499,964 | 2/1985 | Abe et al. | 180/142 |
| 4,538,698 | 9/1985 | Hashimoto | 180/79.1 |
| 4,598,787 | 7/1986 | Drutchas | 180/79.1 |
| 4,624,335 | 11/1986 | Shiraishi | 180/133 |
| 4,653,601 | 3/1987 | Nakamura et al. | 180/142 |

FOREIGN PATENT DOCUMENTS 2845864  5/1979  Fed. Rep. of Germany .

OTHER PUBLICATIONS

Servomechanism Fundamentals (Ben Zeines).

Primary Examiner—David M. Mitchell
Assistant Examiner—Donn McGiehan
Attorney, Agent, or Firm—Tarolli, Sundheim & Covell

[57] ABSTRACT

A power assist steering system in which electrical power to drive the electric assist motor is selectively provided from either the alternator or the battery depending upon the vehicle speed and applied steering torque. An electronic control unit controls the output voltage from the alternator by controlling current through the alternator field coil.

16 Claims, 6 Drawing Sheets

ELECTRIC ASSIST STEERING SYSTEM WITH ALTERNATOR POWER SOURCE

TECHNICAL FIELD

The present invention relates to a power assist steering system and particularly relates to an electrical control apparatus for applying electrical power to an electric power assist motor.

BACKGROUND ART

There are many known power assist steering systems that use hydraulic power, electric power or a combination thereof. Examples of electric power assist steering systems are shown in U.S. Pat. Nos. 3,983,953 and 4,415,054.

In U.S. Pat. No. 3,983,953, an electric assist motor is coupled to an input steering shaft and energized in response to torque applied to the vehicle steering wheel. When energized, the electric motor applies a rotary drive force to a pinion gear of a rack and pinion gear set and thereby assists the driver in accomplishing the steering maneuver.

U.S. Pat. No. 4,415,054 describes a system in which an electric assist motor having a rotatable armature is coupled to a nut of a ball-nut assembly. A screw of the ball-nut assembly is integral with a rack member of a rack and pinion gear set. Rotation of the armature produces linear movement of the rack member. Linear movement of the rack member effects steering movement of the steerable wheels of the vehicle. The electric assist motor is actuated in response to operator-applied torque to the vehicle steering wheel. The electric assist motor, when actuated, applies a linear drive force to the rack member to assist the driver.

Previous electric assist steering systems have typically utilized four solid-state switching devices connected in an "H" bridge arrangement to the positive and negative terminals of the vehicle battery and to the electric assist motor. The solid-state switching devices are controlled by an electronic control unit ("ECU") in response to electrically sensed steering direction and sensed steering torque applied to the vehicle steering wheel. The ECU controls the direction of current flow through the electric assist motor by controlling actuation of the solid-state switching devices in pairs. The pair of switching devices actuated depends upon the sensed direction of the applied steering torque. The ECU controls the magnitude of current flow through the electric assist motor by pulse width modulating the signal controlling actuation of at least one of the solid-state switching devices of a selected pair. The magnitude of the power assist is proportional to motor current which, in turn, is controlled by controlling the duty cycle of the pulse width modulated actuation signal.

Such steering systems have proven effective in achieving the desired function of providing adequate steering assist under all vehicle operating conditions. However, it is desireable to reduce the cost of an electric assist system as compared to known systems. A significant fraction of the system cost is represented by (i) the component cost for electronic devices capable of switching large amounts of current, including peripheral costs such as heat sinks, etc., and (ii) the large number of electrical components needed to provide adequate control of the electric assist motor.

During a high demand steering maneuver, such as dry surface parking, an electric assist motor requires as much as 65 amps to provide adequate assist. Solid-state switching devices capable of switching 65 amps are relatively expensive. Four solid-state switching devices are required in a typical H-bridge network. Also, a large number of other electrical components are necessary to control the H-bridge in response to sensed steering torque and sensed steering direction.

One design, shown in U.S. Pat. No. 4,598,787 to Drutchas and assigned to the assignee of the present application, is directed to an electrical assist steering system that has a reduced number of electrical elements. In the steering system disclosed in the '787 patent, a mechanical switch arrangement is provided including four mechanical switches connected in an "H" network to an electric assist motor, to one terminal of the vehicle battery, and to a drive circuit. The drive circuit includes a single solid-state switching device. Upon application of torque to the vehicle steering wheel, a pair of the four switches are mechanically closed across the electric assist motor to control the direction of electrical power applied thereto. This arrangement thus does not require electrical elements to sense direction or electrical elements to control closing of the pair of switching devices. The magnitude of the electrical current applied to the electric assist motor is controlled by pulse width modulating the single solid-state switching device in the drive circuit.

Even though the arrangement disclosed in the '787 patent to Drutchas significantly reduces the number of electrical elements required for an electric assist steering system, the solid-state switching device that controls motor current must still be capable of switching 65 amps, and must do so at the frequency of the pulse width modulated control signal.

It is desirable to provide a more cost effective electric assist steering system than has heretofore been provided that (i) utilizes a minimum number of electrical elements while maintaining full system control and (ii) provides sufficient operating current to the electric assist motor under all operating conditions.

SUMMARY OF THE INVENTION

The present invention, in accordance with one embodiment, provides a new and improved electric power assist steering system that selectively utilizes the output of the vehicle alternator or the output of the vehicle battery to provide electrical power for energization of an electric assist motor. Controls are provided to regulate the alternator output voltage responsive to sensed vehicle operating parameters and to provide variable electrical power to drive the electric assist motor responsive to such operating parameters. The alternator output voltage is controlled by regulating current through the alternator field coil. The field coil current that is electrically controlled is substantially less, e.g., 4.25 amps, than the current draw of the electric assist motor, e.g., 65 amps, during a full assist condition and can, therefore, be controlled more cost effectively as compared to previous known systems.

A power assist steering apparatus, in accordance with one embodiment of the present invention, comprises a power steering means operatively connectable to a steering linkage for providing a steering force responsive to applied electrical power. Generating means is operatively drivable by an engine for, when driven, generating a controllable electrical signal. Sensing means is provided for sensing a vehicle operating parameter and for generating an electrical signal indicative of the sensed parameter. Switching means is connected to the generating means and to the power steering means for, in one position, connecting the generating means to the power steering means. The switching means switches to the one position to connect the generating means to the power steering means in response to the sensed vehicle operating parameter.

In one embodiment, a vehicle steering wheel is connected to an input shaft which is in turn connected to a pinion gear through a torsion bar. A position sensor is connected to the input shaft and pinion gear across the torsion bar and produces an electrical signal indicative of the rotational displacement between the input shaft and the pinion gear which, in turn, is indicative of the amount of applied input torque. A vehicle speed sensor is provided for sensing vehicle speed and for generating an electrical signal indicative thereof.

A mechanical switch arrangement is coupled between the input shaft and the pinion gear and is electrically connected to an electric assist motor. An alternator is drivably connected to the vehicle engine for, when driven, generating an electrical signal having a value proportional to the current through its field coil.

A first relay having a double-pole, single-throw switch has a normally open switch connected to the vehicle battery and to the mechanical switch assembly. A second, normally closed switch of the first relay is connected to the mechanical switch arrangement and electrical ground. A second relay having a double-pole, double-throw switch has a first switch connected to the output of the alternator through a current sensor, to the vehicle battery, and to the mechanical switch assembly for selectively connecting the output of the alternator to the battery or to the mechanical switch assembly. A second switch of the second relay is connected to the alternator field coil, an electronic control unit, and a voltage regulator for selectively connecting the field coil to the ECU or to the voltage regulator. A power modulator is connected between the mechanical switch assembly and ground and is connected to the ECU.

The ECU monitors the output current from the alternator, the applied steering torque, and vehicle speed and controls the relays in response thereto. When steering torque is less than a predetermined value, the alternator is connected to the battery for charging. When steering torque is equal to or greater than the predetermined value, the alternator is connected to the electric assist motor for energization thereof through actuation of the second relay. The alternator output is controlled by controlling current through the alternator field coil. If the alternator output current is less than a predetermined value, the battery is connected to the electric assist motor through actuation of the first relay and power assist is controlled using the power modulator.

In accordance with another embodiment of the present invention, two alternators are driven from the vehicle engine. One alternator provides electrical power for all of the vehicle's electrical loads except the electric assist motor. The second alternator provides electrical power for the electric assist motor. Each of the two alternators has its own voltage regulator circuit. The voltage regulator circuit for the electric assist motor alternator controls the electrical current through its associated field coil in response to at least one vehicle operating parameter. The vehicle operating parameters include applied steering torque and sensed vehicle speed.

DESCRIPTION OF THE DRAWINGS

Other features and advantages of the invention will be apparent to those skilled in the art by reference to the following detailed description taken in connection with the accompanying drawings wherein.

DETAILED DESCRIPTION

Figure 1:
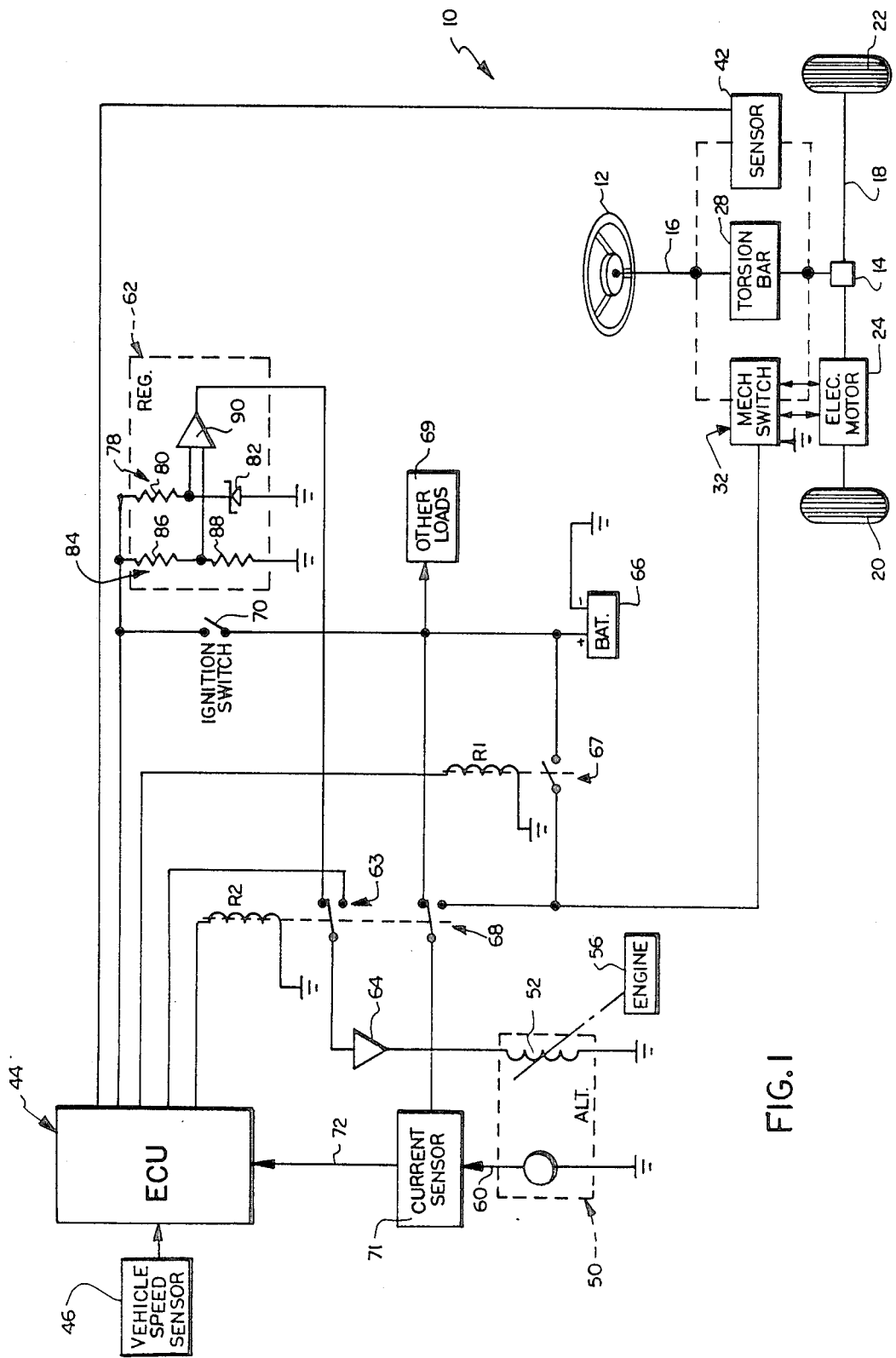
FIG. 1 is a schematic illustration of a vehicle steering system in accordance with the present invention.

A vehicle power assist steering assembly 10 is shown in FIG. 1 which includes a steering wheel 12 mechanically coupled to a pinion gear 14 through an input shaft 16 and torsion bar 28. The pinion gear 14 meshingly engages rack teeth disposed on a steering member 18 which is connected to steerable wheels 20, 22 of the vehicle in a known manner. Rotation of the steering wheel 12 causes steering movement of the steerable wheels 20, 22.

An electric assist motor 24 circumscribes the steering member 18 and is drivingly connected thereto by a ball-nut drive assembly (not shown). A power assist steering system having such an electric assist motor and ball-nut drive assembly is fully described in U.S. Pat. No. 4,415,054 to Drutchas, assigned to the assignee of the present application, and is hereby fully incorporated herein by reference.

Figure 2:
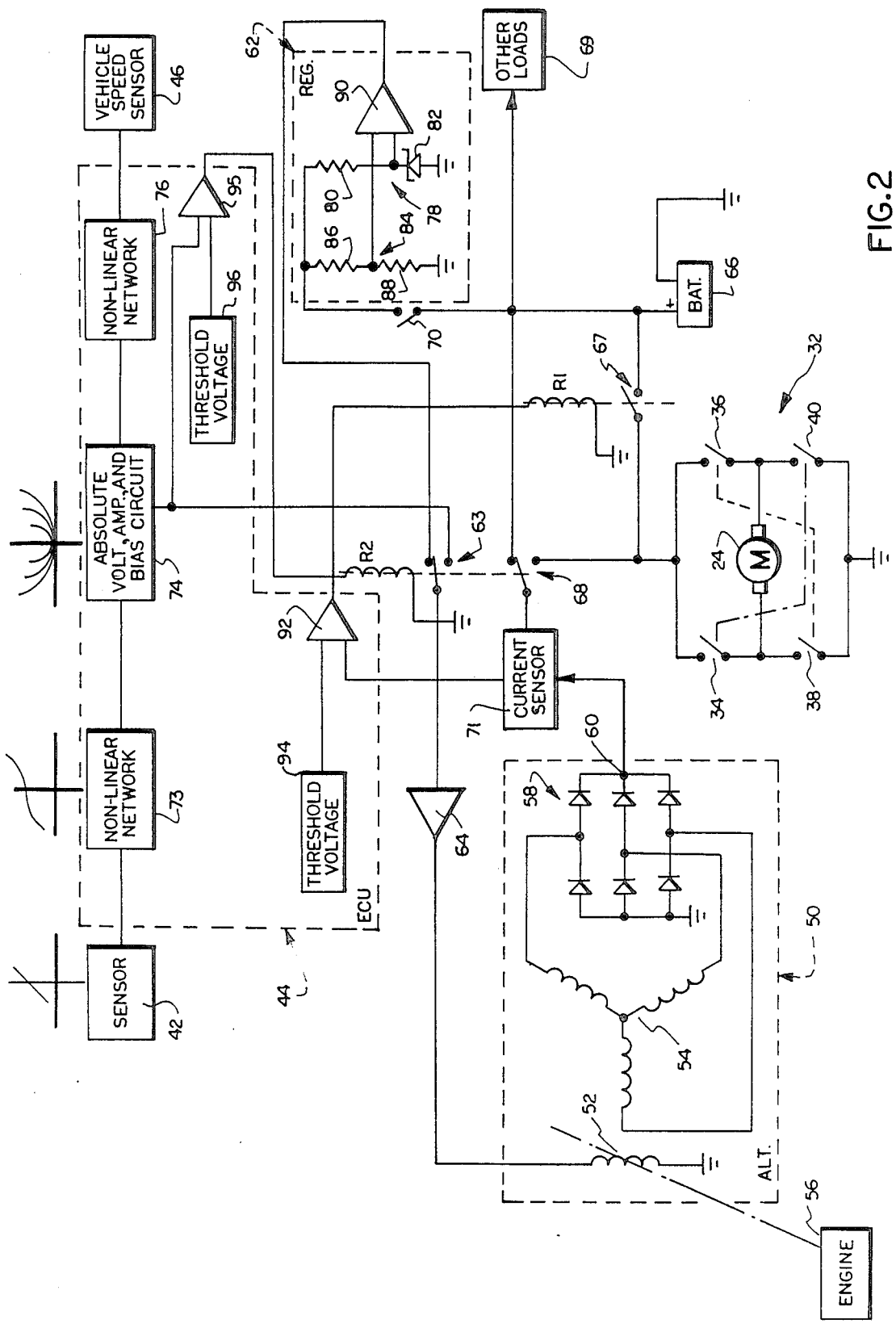
FIG. 2 is a schematic illustration of the control circuitry of the vehicle steering system in accordance with the present invention.

A mechanical switch assembly 32 is connected to the input shaft 16 and the pinion gear 14 across the torsion bar 28. As shown in FIG. 2, the assembly 32 includes four mechanically actuatable switches 34, 36, 38 and 40 connected in a "H" network. The switches 34, 36, 38 and 40 are mechanically coupled across the torsion bar 28 in such a fashion that twisting of the torsion bar 28 causes actuation of pairs of the switches.

The four switches are normally open when no torque is applied to the vehicle steering wheel 12. The switches close in pairs upon application of steering torque to the steering wheel 12. If input torque is applied to the steering wheel 12 in one direction, switches 34, 40 close and if input torque is applied to the steering wheel 12 in the other direction, switches 36, 38 close.

The junction of switches 34, 38 is connected to one side of the electric assist motor 24 and the junction of switches 36, 40 is connected to the other side of the electric assist motor 24. The junction of switches 38, 40 is connected to electrical ground and the junction of switches 34, 36 is connectable to a source of electrical energy. Such a mechanical switch assembly is fully disclosed in U.S. Pat. No. 4,598,787 to Drutchas, assigned to the assignee of the present invention, and is hereby fully incorporated herein by reference.

A position sensor 42 is connected to the input shaft 16 and the pinion gear 14 across the torsion bar 28 and provides an electrical signal having a value proportional to the amount of relative rotation between the input shaft 16 and the pinion gear 14. The position sensor 42 in combination with the torsion bar 28 form a torsion sensor. The output signal from the sensor 42 is proportional to the amount of input torque applied to the vehicle steering wheel 12.

The sensor 42 is connected to an electronic control unit ("ECU") 44. The output from a speed sensor 46 is also connected to the ECU 44. The speed sensor 46 monitors the ground speed of the vehicle and generates an electrical signal indicative thereof.

An alternator 50 is provided and includes a rotatable field coil 52 and a "Y" configured stator coil 54. The field coil 52 is rotatably drivable by the vehicle engine 56 through a belt in a known manner. The outputs of the stator coils 54 are rectified by a diode network 58. The output 60 of the diode network 58 is the output of the alternator 50.

The output 60 is a DC voltage having a value proportional to the current through the field coil 52. The field coil 52 is selectably connectable to a voltage regulator 62 or to the ECU 44 through one switch 63 of a double pole, double throw relay R2 and a power amplifier 64. The relay R2 is operatively connected to and controlled by the ECU 44. The control of the alternator by the ECU 44 or the voltage regulator 62 is discussed below in detail.

A vehicle battery 66 is selectively connectable to the mechanical switch assembly 32 through a switch 67 of a single pole, single throw relay R1. The relay R1 is operatively connected and controlled by ECU 44. The operation and control of relay R1 is described below in detail.

A second switch 68 of the double pole, double throw relay R2 is connected to the output of alternator 50, the battery 66, and to the junction of switches 34, 36 of the mechanical switch assembly 32. Switch 68 selectively connects the output 60 of the alternator 50 to the battery 66 or to the mechanical switch assembly 32. Other electrical loads 69, such as lights, wipers, radio, etc., are connected to the battery 66 in the usual manner. Electrical power to operate the ECU 44 is derived from the battery 66. An ignition switch 70 connects the ECU 44 and regulator 62 to the battery 66 when the switch 70 is in a RUN position.

In operation, the ECU 44 (i) determines if power assist is needed for an inputted steering manuever based on vehicle speed and applied steering torque, (ii) controls, if steering assist is needed, whether the battery or the alternator supplies electrical power to the mechanical switch assembly 32, (iii) controls the output voltage of the alternator 50, when the alternator is connected to the mechanical switch assembly 32, in response to sensed vehicle speed and sensed steering torque applied to the vehicle steering wheel, and (iv) connects the output of the alternator to the battery when steering assist is not required for the purpose of charging the battery.

A current sensor 71 is connected to the output 60 of the alternator 50. The current sensor 71 can be of the inductive type or resistive type, for example. The current sensor 71 outputs an electrical signal 72 to the ECU 44 indicative of the current output from the alternator 50. The ECU 44 monitors the output signal 72 from the current sensor 71.

Referring to FIG. 2, the ECU 44 includes a non-linear network 73 which is connected to the output of the position sensor 42. The output signal from the position sensor 42 has a voltage value of, for example, 4 V.D.C. when no input torque is applied to the steering wheel 12. As torque is applied to the steering wheel 12 in one direction or the other, the output signal from the position sensor 42 increases or decreases from the no-torque voltage value. The non-linear network 73 processes the output signal from the position sensor 42 and outputs a non-linear signal having a wave shape approximately as depicted in FIG. 2 where the Y-axis is D.C. voltage and the X-axis is applied steering torque left and right.

The output signal from the non-linear network 73 is connected to an absolute voltage amplifier and bias circuit 74. The circuit 74 transposes the Y-axis values of the output signal from the non-linear network 73 (as, for example, by subtracting a D.C. voltage from the torque sensor output signal) such that the Y-axis value is equal to zero at the Y-axis cross-over point. The circuit 74 further takes the absolute value of the resulting bias-shifted signal. The resultant transfer characteristic (torque versus output signal) after performing the transposition and taking the absolute value of the sensor signal is generally parabolic in form with output (Y value) equal to zero when torque input (X value) equals zero.

The output signal from the vehicle speed sensor 46 is operatively connected to a non-linear network 76 that, in turn, outputs a control signal to the absolute voltage amplifier and bias circuit 74. The control signal from the non-linear network 76 controls the gain of circuit 74 and thus the shape of the parabolic transfer characteristic of circuits 73, 74. Preferably, gain will be an inverse function of vehicle speed such that gain (and, thus, torque assist) will decrease as speed increases. Therefore, the output signal from the circuit 74 is functionally dependent upon both applied steering torque and vehicle speed.

The output from circuit 74 is connected to one terminal of switch 63 of relay R2. The other terminal of switch 63 is connected to the output of the voltage regulator 62.

The voltage regulator 62 is connectable to the battery 66 through the ignition switch 70. The regulator includes a voltage reference leg 78 having a resistor 80 and Zener diode 82 connected in series across the vehicle battery 66. The voltage at the resistor/Zener junction is equal to the rating of the Zener. The regulator 62 further includes a voltage sensing leg 84 having resistors 86, 88 connected in series across the vehicle battery 66. The resistor/resistor junction of leg 84 is connected to one input of a differential amplifier 90. The resistor/Zener junction is connected to the other input of differential amplifier 90. The output of differential amplifier 90 is the output of the voltage regulator 62 and is connected to a terminal of switch 63 of relay R2. When the relay R2 connects the output of voltage regulator 62 to the field coil 52 of the alternator 50 through power amplifier 64, the alternator outputs sufficient current to charge the battery to a value controlled by the selected values of the resistors in voltage sensing leg 84 and the value of the Zener diode selected in voltage reference leg 78 of the regulator 62.

The relay R1 is controlled in response to the output current from the alternator. Specifically, the output from the current sensor 71 is connected to one input of a comparator 92. The output signal from the current sensor 71 is a DC voltage having a value proportional to the current output from alternator 50. Since the alternator 50 is always connected to either electric assist motor 24 or to the battery 66 and other loads 69, the alternator always outputs at least a minimum current level. Therefore, the output signal 72 from the current sensor 71 is always greater than some minimum value when the alternator 50 is properly working.

The other input of the comparator 92 is connected to a DC threshold reference voltage circuit 94 that is less than the minimum DC level from the sensor 71 expected under all normal operating conditions of the alternator 50. The output of the comparator 92 is connected to and controls relay R1.

When the alternator output current is equal to or greater than the predetermined minimum value, the ECU 44 generates an electrical signal to command relay R1 to open switch 67 thereby disconnecting the battery from the mechanical switch assembly 32. If the alternator fails, if the drive belt breaks, or if the vehicle engine stalls, the alternator output current would drop below the predetermined minimum value. When such an occurrence is detected by the comparator 92, an electrical signal is generated to close the switch 67 of relay R1 to connect the output of the battery 66 to the mechanical switch assembly 32. Thus, power assist is available because electrical power for the electric assist motor is supplied by the battery 66.

The relay R2 is controlled in response to vehicle speed and applied steering torque. Specifically, the output of the absolute voltage amplifier and bias circuit 74 is connected to one input of a comparator 95. The other input of comparator 95 is connected to a DC threshold reference voltage circuit 96. The output of the comparator 95 is connected to and controls relay R2. As is known in the art, it is desirable to decrease the amount of available power assist as vehicle speed increases. Since less torque is required to turn the vehicle steering wheel as vehicle speed increases, decreasing available power assist with increasing vehicle speed provides a satisfactory steering feel at all vehicle speeds.

The graph located above the circuit 74 depicts a plurality of possible output signals from circuit 74 which are a function of both vehicle speed and applied steering torque. The Y-axis is voltage and X-axis is applied steering torque. Each of the parabolic curves represents an assist characteristic for a given vehicle speed. When vehicle speed is at a relatively low value, the slope of the torque curve is relatively steep. As vehicle speed increases, the slope of the torque curve broadens out. The resultant output voltage from circuit 74 for a given amount of applied steering torque decreases as vehicle speed increases. Therefore, the amount of power assist provided for a given amount of applied steering torque decreases as vehicle speed increases.

It is desirable not to apply any power assist until the applied steering torque exceeds a predetermined level. The predetermined level is dependant upon vehicle speed. A predetermined minimum output voltage from circuit 74 is representative of a predetermined amount of steering torque that varies as a function of vehicle speed. The threshold voltage circuit 96 outputs a DC voltage equal to predetermined minimum torque value below which no power assist is provided.

Once the applied steering torque for a given vehicle speed is equal to or exceeds the predetermined minimum, the comparator 95 outputs a control signal to relay R2 to change the states of switches 63 and 68 so as to connect the output of the absolute voltage amplifier and bias circuit 74 to the field coil 52 through power amplifier 64 and connect the output 60 of alternator 50 to the mechanical switch assembly 32. If the output signal from circuit 74 is less than the output of threshold voltage circuit 96, the comparator 95 outputs a second control signal to relay R2 to change the states of switches 63 and 68 so as to connect the voltage regulator 62 to the field coil 52 of alternator 50 through power amplifier 64 and connect the output 60 of the alternator 50 to the battery 66.

To better understand the operation of the present invention, assume that the vehicle operator initiates a steering maneuver by applying torque to the vehicle steering wheel 12. Assume further that the amount of applied steering torque is low enough, for the sensed vehicle speed, that the output of circuit 74 is less than the threshold value outputted by circuit 96 for the sensed vehicle speed. The ECU 44, under such an occurrence, through comparator 95, controls the relay R2 so as to maintain the connection between the output 60 of the alternator 50 and the battery 66. The voltage regulator 62 controls the alternator output so as to maintain its output voltage at a normal charging value.

Once steering torque is applied to the vehicle steering wheel at a level sufficient that the output of circuit 74 is equal to or greater than the value outputted by the threshold circuit 96, the ECU 44, through comparator 95, controls the relay R2 so as to connect the output 60 of the alternator 50 to the mechanical switch assembly 32. The ECU 44, through the absolute voltage amplifier and bias circuit 74, controls the output voltage 60 of the alternator 50 as a function of the sensed vehicle speed and the sensed steering torque.

While the electric assist motor is being powered by the alternator, the other electrical loads 69 of the vehicle are powered solely from the battery 66. Upon completion of a steering maneuver, i.e., once the sensed steering torque drops low enough for a given vehicle speed, the ECU 44, through comparator 95, causes the relay R2 to switch states to connect the output 60 of the alternator 50 to the battery 66 and connect the voltage regulator 62 to the field coil 52.

Figure 3:
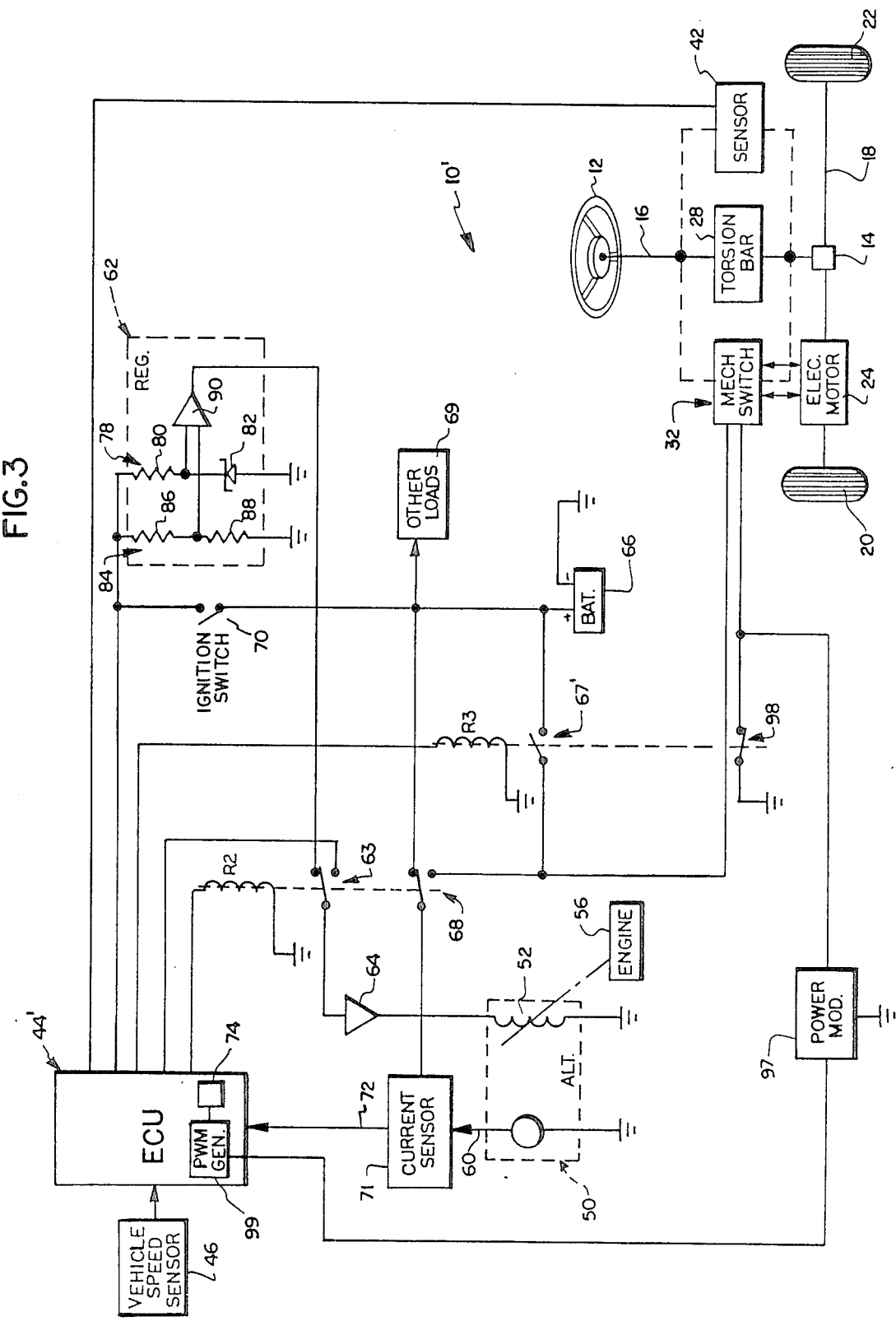
FIG. 3 is a schematic illustration of another embodiment of a vehicle steering system in accordance with the present invention.

Referring to FIG. 3, another embodiment of the present invention is depicted. In FIG. 3, like numerals designate like elements of structure of the embodiment shown in FIGS. 1 and 2 and discussed above. The power steering system 10' includes all the elements described above with regard to FIGS. 1 and 2 and further includes a power modulator 97 connected between the mechanical switch assembly 32 and electrical ground. The power modulator 97 is connected to the ECU 44 and is controlled thereby. A relay R3 replaces the relay R1 described above. Relay R3 is a double-pole, single-throw relay including a normally open switch 67' connected in the same manner described above with regard to switch 67. Relay R3 further includes a normally closed switch 98 connected in parallel across the power modulator 97 to, when closed, short circuit the power modulator thereby electrically connecting one side of the mechanical switch assembly 32 directly to ground resulting in the connection arrangement shown in FIG. 2.

The control of relay R3 is the same as described above with regard to control of relay R1. The output of the comparator 92 is connected to Relay R3. If the sensed current from the output 60 of alternator 50 is equal to or greater than the predetermined value established by threshold output voltage of circuit 94, relay R3 is in a state such that switch 67' is open and switch 98 is closed. If steering torque is then applied which is equal to or greater than the threshold output voltage of circuit 96, the relay R2 is switched to a state so as to connect the output 60 of alternator 50 to the mechanical switch assembly 32. The other connection of the mechanical switch assembly is connected to ground through switch 98 of relay R3.

If the sensed output current from alternator 50 is less than the predetermined amount established by threshold output voltage of circuit 94, the comparator 92 generates a control signal to switch the state of relay R3 so as to close switch 67' and open switch 98. In this condition, the positive terminal of battery 66 is connected to the junction of switches 34, 36 of the mechanical switch assembly 32 through switch 67'. The junction of switches 38, 40 of the mechanical switch assembly 32 is connected to the power modulator 97 which is, in turn, connected to electrical ground. The power modulator 97 is controlled by the ECU 44' to control the motor current through the electric assist motor 24 in response to applied steering torque and sensed vehicle speed.

Specifically, the output of the absolute voltage amplifier and bias circuit 74 is connected to a pulse width modulation ("PWM") generator 99 which is connected to the power modulator 97. The PWM generator generates a modulating control signal having a constant frequency and a variable duty cycle. The duty cycle is controlled in response to the output signal from the circuit 74, which, as discussed above, is proportional to the applied steering torque and sensed vehicle speed.

The power modulator 97 preferably includes a solid-state switching device, such as an FET, operatively connected between the junction of switches 38, 40 of the mechanical switch assembly and electrical ground. The switching device is actuatable to an ON or OFF condition by the PWM generator 99. Motor current is proportional to the duty cycle of the output signal from the PWM generator 99.

Figure 4:
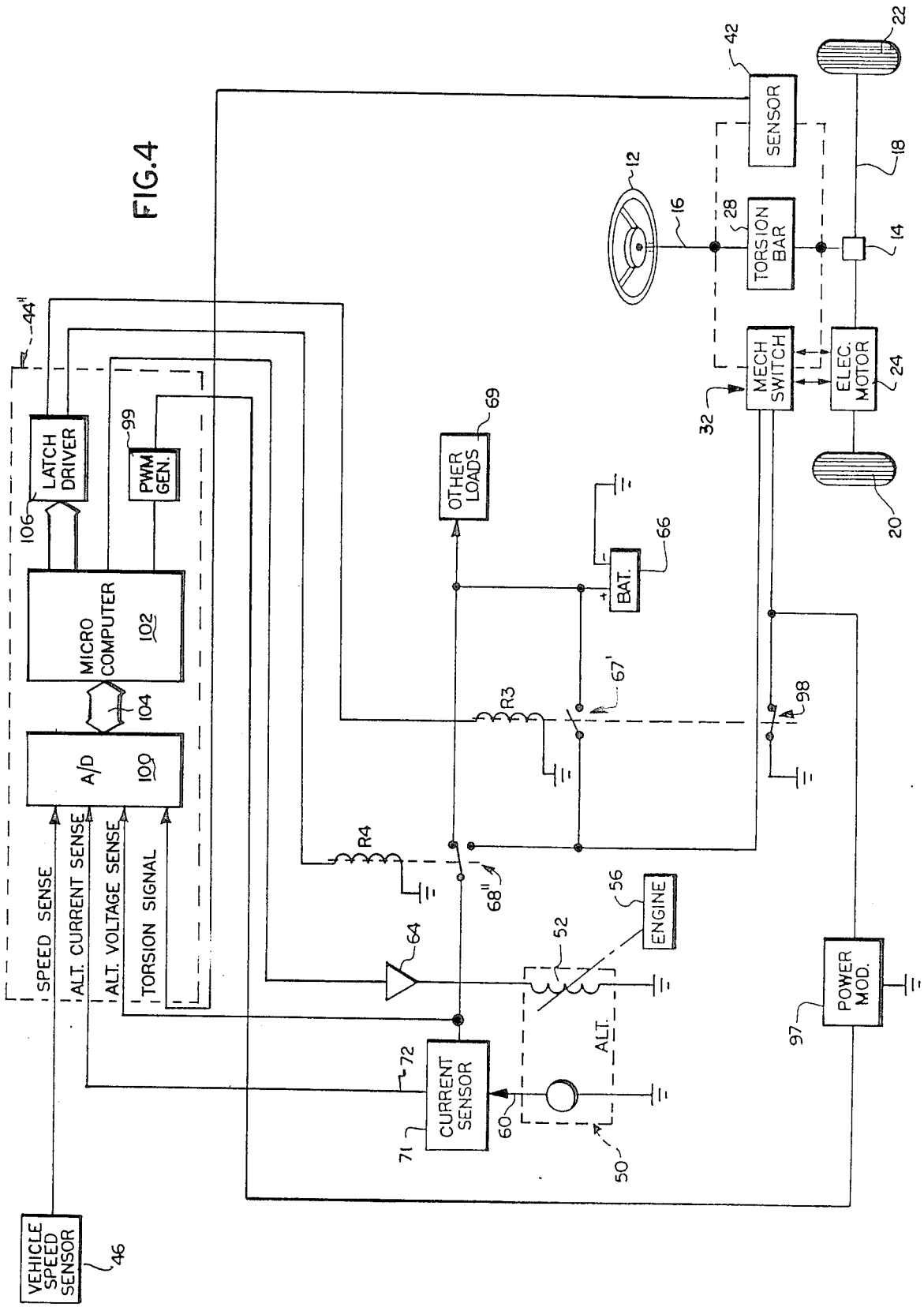
FIG. 4 is a schematic illustration of another embodiment of a vehicle steering system in accordance with the present invention.

Referring to FIG. 4, yet another embodiment of the present invention is schematically illustrated for accomplishing the same features and advantages of the embodiments described above by utilizing a microcomputer based system and software control. In FIG. 4, like numerals designate like elements of structure of the embodiments described above. An ECU 44'' includes an A/D converter 100 that receives (i) a torsion signal from a position sensor 42 indicative of applied steering torque, (ii) a speed signal from a sensor 46 indicative of vehicle speed, (iii) an alternator current sensor signal 72 from a current sensor 71, and (iv) a signal indicative of the alternator output voltage. The A/D converter is connected to a microcomputer 102 by a bus 104. The operative interaction between the A/D converter 100 and microcomputer 102 is known in the art and is, therefore, not described in detail herein. Basically, the microcomputer addresses an incoming line of the A/D converter. The A/D converter outputs a digital signal indicative of the voltage level of the addressed incoming line.

A latch/driver circuit 106 is connected to an output of the microcomputer 102 and is connected to relays R4 and R3. Relay R4 includes a single pole, double-throw switch 68'' connected in a similar manner as described above with regard to switch 68. The microcomputer monitors the torsion signal and the speed sensor signal and controls relay R4 in response thereto in a functionally similar manner as described above with regard to Relay R2. Also, the microcomputer monitors the alternator current sense signal and controls relay R3 in a functionally similar manner as described above.

The power amplifier 64 is connected to another output of the microcomputer 102 for control of the alternator output by controlling current through the field coil 52. In this microcomputer embodiment, the ECU controls the alternator in both modes of its operation, i.e., (i) in its charging mode and (ii) in its motor driving mode. This not only eliminates the need for a separate voltage regulator for the charging mode but also eliminates the need for a relay switch to separately connect the field coil to a regulator or the ECU. During the charging mode, the microcomputer monitors the alternator voltage sense line and outputs a control signal to the alternator field coil 52 through power amplifier 64 to control the alternator output to a proper charging level. During the motor driving mode, the microcomputer outputs a control signal to tne field coil such that the alternator outputs an adequate amount of electrical power to drive the electric assist motor in response to applied steering torque and sensed vehicle speed.

Also, connected to the output of the microcomputer 102 is the PWM generator 99 which is, in turn, connected to the power modulator 97. The PWM generator 99 and the power modulator 97 operate in a functionally similar manner as described above.

Figure 5:
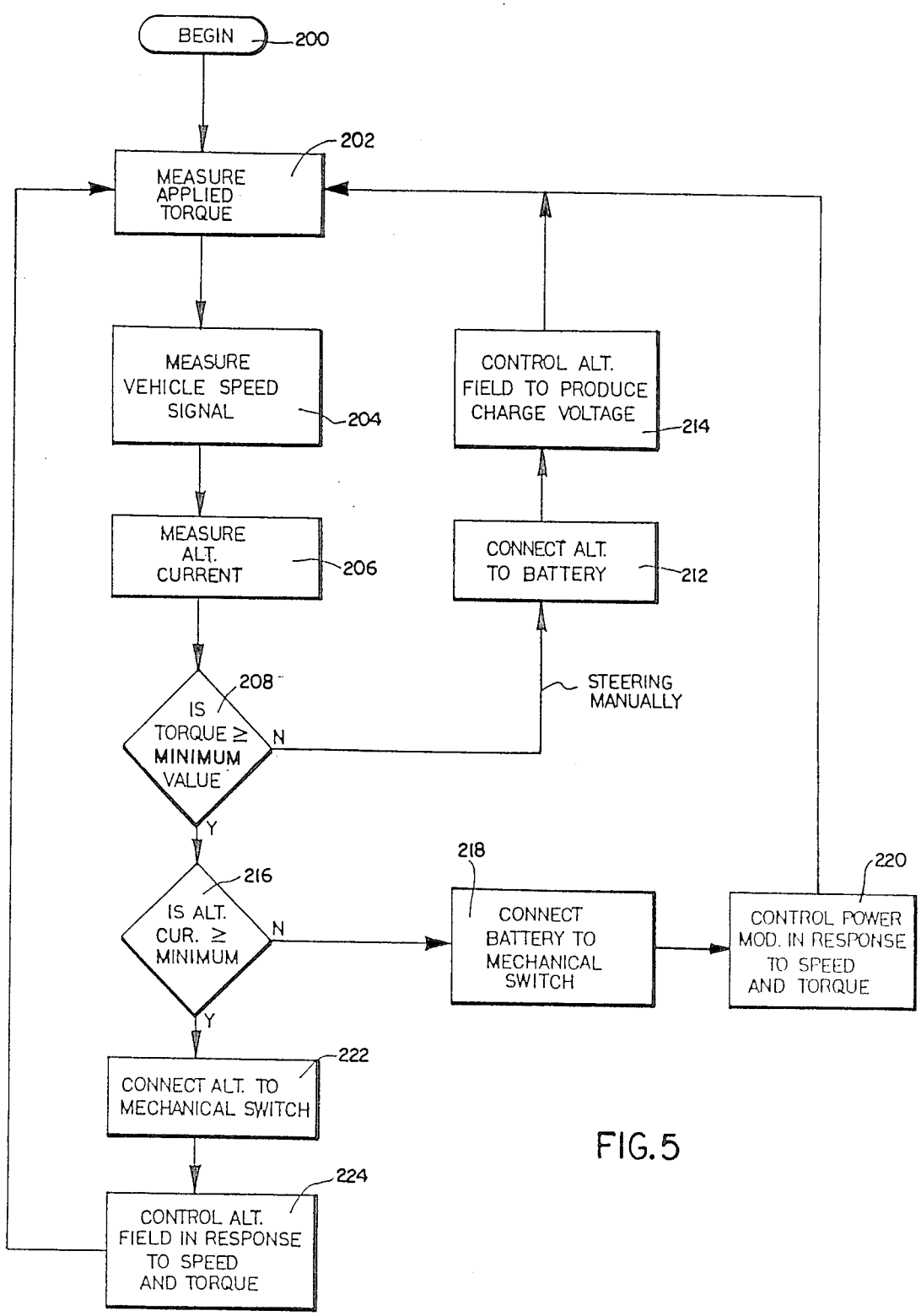
FIG. 5 is a flow diagram depicting the operating steps of a vehicle steering system in accordance with the present invention.

Referring to FIG. 5, a flow chart depicts operational steps of an electric assist steering system in accordance with the embodiment of the present invention schematically illustrated in FIG. 4. The system operation begins at step 200, where the ignition switch 70 is positioned in the RUN position after the vehicle is started.

In step 202, the output of the position sensor 42 is measured in order to determine the applied steering torque. The output signal from the sensor 42, it will be recalled, is representative of torque. In step 204, the ECU 44'' measures the output of the speed sensor 46 in order to determine vehicle speed. In step 206, the ECU 44'' measures the output signal of the current sensor 71 in order to determine alternator current.

In step 208, a determination is made as to whether the applied steering torque is greater than a predetermined minimum value. If the determination in step 208 is negative, the program proceeds to step 212. In step 212, the output of the alternator 50 is connected to the battery 66 by relay R4 for charging and, in step 214, the ECU 44'' controls the current through the alternator field coil 52 so that the alternator outputs a proper charging voltage. The program then loops back to step 202 and proceeds through the loop as discussed above.

If the decision in step 208 is affirmative, thereby indicating that power assist is desired to accomplish the steering maneuver, the program proceeds to step 216 where a determination is made as to whether the alternator output current is equal to or greater than a predetermined minimum value. If the determination in step 216 is negative, the program proceeds to step 218 where the battery 66 is connected by switch 67' of relay R3 to the mechanical switch assembly 32. Switch 98 of relay R3 opens. The program proceeds from step 218 to step 220 where the ECU 44'' controls the power modulator 97 through the PWM generator 99 in accordance with measured vehicle speed and applied steering torque.

If the determination in step 216 is affirmative, the program proceeds to step 222. In step 222, the alternator 50 is connected to the mechanical switch assembly 32 through switch 68" of relay R4 and is disconnected from the battery. Switch 98 is closed to short circuit the power modulator 97 and switch 67' is opened. The output of the alternator 50 is controlled, in step 224, by the ECU 44" in response to the measured steering torque and the measured vehicle speed. The program then loops back from step 224 to step 202.

The invention has been described above referring to embodiments in which all electrical power is provided to the electric assist motor from the alternator when the alternator output current is equal to or greater than a predetermined minimum threshold value and the applied steering torque is equal to or greater than a threshold value which is a function of vehicle speed. In accordance with another embodiment of the present invention, the ECU 44" selectively provides electrical power to the electrical assist motor from either the alternator or the battery depending on the amount of assist requested, as determined by the sensed steering torque and the sensed vehicle speed. If the amount of assist requested would require a motor current less than a predetermined value, e.g., 10 amps, the ECU 44" connects the battery to the mechanical switch assembly 32. Current below 10 amps is controlled by the ECU 44" using the battery and the power modulator 97. If the amount of assist requested would require a motor current equal to or greater than the predetermined value, e.g., 10 amps, the ECU 44" connects the alternator output to the mechanical switch assembly 32 and switch 98 is closed. The motor current is then controlled by controlling current through the alternator field coil as described above.

The amount of current that is needed to accomplish a steering maneuver can be calculated from the steering torque signal and the vehicle speed signal. The ECU 44" calculates the amount of current and controls the source of electrical power, i.e., the battery or the alternator, for the electric assist motor in response thereto.

Figure 6:
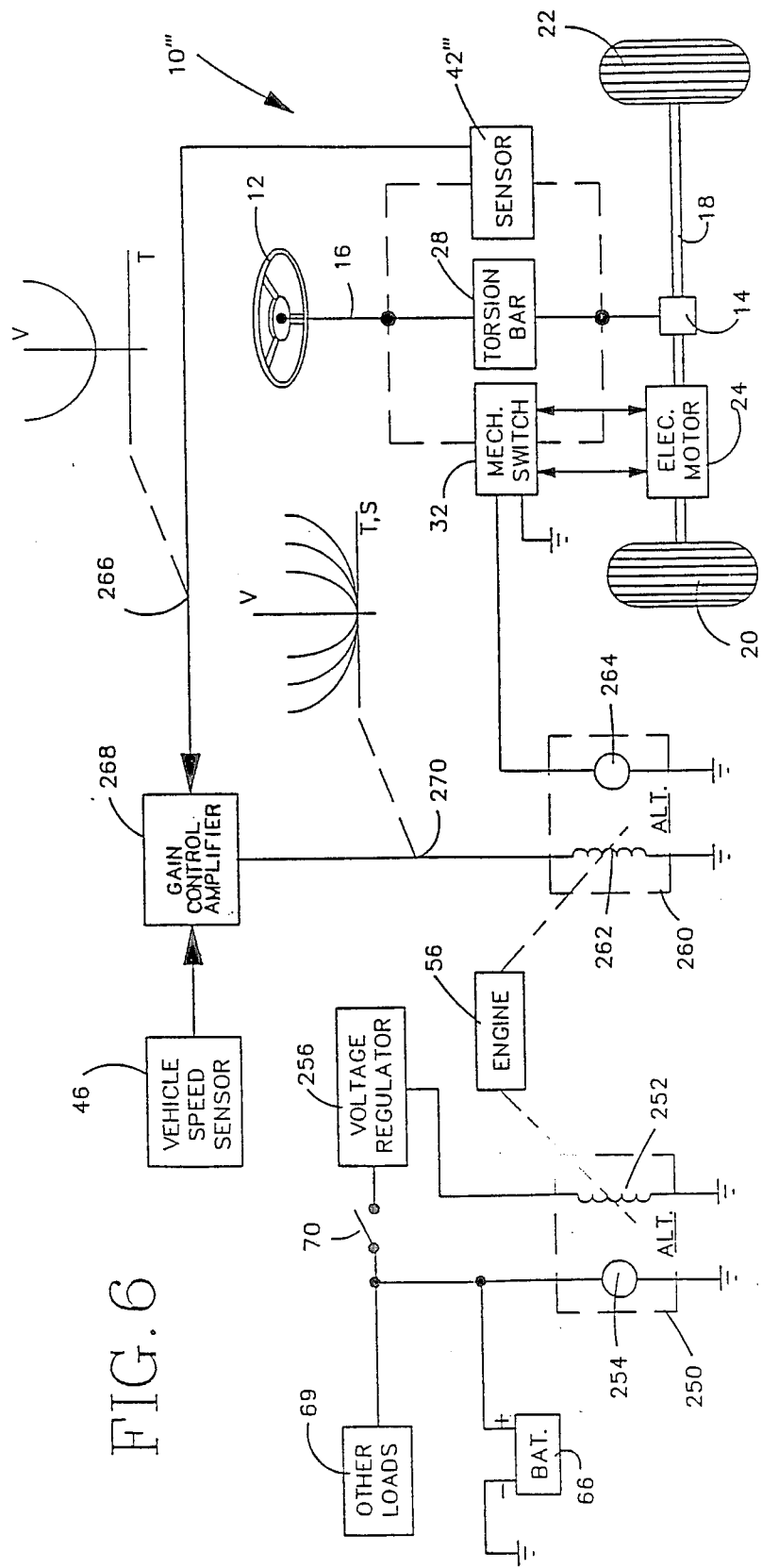
FIG. 6 is a schematic illustration of another embodiment of a vehicle steering system in accordance with the present invention.

Referring to FIG. 6, another embodiment of the invention is schematically illustrated in which like numerals designate like elements of structure of the embodiments described above. A first alternator 250 provides electrical power for the vehicle's electrical loads 69. The first alternator 250 includes a field coil 252 mechanically drivable in rotation by the vehicle engine 56 through a belt and pulley arrangement. A stator coil 254 of the first alternator 250 is electrically connected to the vehicle battery 66 and to the other electrical loads 69 of the vehicle through the ignition switch 70. A voltage regulator 256, of the type well known in the art, is electrically connected to the output of the first alternator 250 through the ignition switch 70 and the field coil 252. The voltage regulator 256 controls the electrical current through the field coil so as to have the first alternator 250 provide sufficient electrical power for the loads 69 and to charge the battery 66.

The power assist steering system 10''' includes a second alternator 260 for providing electrical power to the electric assist motor 24. The second alternator 260 includes a field coil 262 mechanically drivable in rotation by the vehicle engine 56 through a belt and pulley arrangement. A stator coil 264 of the second alternator 260 is electrically connected to the junction of switches 34, 36 of the mechanical switch assembly 32.

A position sensor 42''' is operatively connected across the torsion bar 28 and outputs an electrical signal 266 that is indicative of applied steering torque. As is graphically depicted, the relationship between output volts and applied steering torque is, in one preferred embodiment, parabolic. The output of the sensor 42''' is electrically connected to the an input of a gain control amplifier 268. The output of the vehicle speed sensor 46 is electrically connected to gain control input of amplifier 268. The output signal 270 of amplifier 268 is electrically connected to the field coil 262 of second alternator 260.

The amplifier 268 biases the input signal 266 from the sensor 42''' so that zero volts is outputted when applied steering torque is equal to zero. The speed signal from the vehicle speed sensor is used to control the gain of the amplifier 268 such that the gain is an inverse function of the sensed vehicle speed. Thus, power assist will decrease as vehicle speed increases. Each of the parabolic curves depicted for the output 270 of the amplifier 268 represent a different vehicle speed. The parabolas broaden out as vehicle speed increases.

The control of the second alternator 260 in FIG. 6 is a closed loop system. When steering torque is first applied, the amplifier 268 outputs a DC voltage to the field coil 268 of the second alternator 260. The alternator 260 outputs electrical energy to the electric assist motor 24 in a direction controlled by the mechanical switch assembly 32. As the electric assist motor drives the steering member 18, the torsion bar 28 untwists thereby decreasing the output signal 266 from sensor 42'''. As the sensor signal 266 decreases, the output signal 270 from the amplifier 268 decreases, thereby closing the system loop.

The first alternator 250 and the second alternator 260 are depicted as separate. The vehicle may be provided with two separate alternators driven by two separate belt and pulley assemblies. Alternatively, the two alternators may be mounted in a single housing with the field coils 252, 262 being rotatably mounted to a single drive shaft. The single drive shaft would be driven by a single belt and pulley assembly. Separate connection terminals for the two field coils is essential to permit individual control of the two alternators.

This invention has been described with reference to preferred embodiments. Modifications and alterations may occur to those skilled in the art upon reading and understanding this specification. It is our intention to include all such modifications and alterations insofar as they come within the scope of the appended claims or the equivalent thereof.

Having described preferred embodiments of the invention, the following is claimed:

1. A power steering apparatus comprising:
power steering means for providing a steering force to a steering linkage in response to an applied electrical signal;
generating means operatively drivable by an engine for, when driven, generating an electrical signal;
sensing means for sensing operator applied steering torque; and
switching means connected to said generating means and to said power steering means for, in a first position, connecting said generating means to said power steering means to apply said electrical signal from said generating means thereto, and, in a second position, connecting said generating means to a storage battery, said switching means switching to said first and second positions in response to sensed steering torque.

2. The apparatus of claim 1 further including regulating means for regulating the electrical signal applied to said power steering means from said generating means responsive to the sensed steering torque.

3. The apparatus of claim 2 wherein said generating means is an alternator having a field coil and a output coil, said regulating means regulating said generated electrical signal by controlling current applied to said field coil.

4. The apparatus of claim 2 further including second sensing means for sensing vehicle speed and wherein said regulating means regulates said electrical signal from said generating means responsive to both sensed steering torque and sensed vehicle speed.

5. The apparatus of claim 4 wherein said power steering means is an electric assist motor.

6. The apparatus of claim 1 further including second switching means connected between said power steering means and said generating means for switchably controlling the direction of the applied electrical signal to said power steering means.

7. A power assist steering system for use in a vehicle having a steering wheel mechanically coupled through steering connection means to steerable wheels to assist an operator in accomplishing a steering maneuver, said system comprising:

sensing means for sensing a vehicle operating parameter and for generating an electrical signal indicative thereof;

an alternator drivably connectable to the vehicle engine and including an output coil and a field coil, the output voltage from the output coil being directly related to the electrical current through said field coil;

electronic control means connected to said sensing means and to said field coil for controlling the output voltage from said alternator in response to the signal generated by said sensing means;

an electric assist motor connected to the steering connection means for, when actuated, applying a steering force to said steering connection means to provide the assist for the operator; and switching means connected to the output of the alternator and controlled by said electronic control means for switchably connecting the alternator output to the electric assist motor or to the vehicle battery responsive to the signal generated by said sensing means.

8. The system of claim 7 wherein said sensing means includes a torsion sensing means connected to said electronic control means for generating an electrical signal indicative of applied steering torque and speed sensing means for sensing vehicle speed and for generating an electrical signal indicative thereof, said electronic control means controlling said switching means responsive to both the sensed vehicle speed and the sensed torque.

9. The system of claim 7 further including current sensing means connected to the output of said alternator and to said electronic control means for generating an electrical signal indicative of the alternator output current and said electronic control means monitors the alternator output current and wherein said system further includes second switching means connected to the battery and to the electric assist motor and controlled by said electronic control means for switchably connecting the battery to said electric assist motor when the alternator output current is less than a predetermined value.

10. A steering apparatus for turning the steerable wheels of a vehicle upon rotation of the vehicle steering wheel, said apparatus comprising:

means for mechanically coupling the vehicle steering wheel with the steerable wheels of the vehicle including, an input shaft connected to said steering wheel for rotation therewith, a pinion gear, a torsion member resiliently connecting said input shaft to said pinion gear, and a steering member having rack teeth thereon drivingly engaged by said pinion gear and connected to said steerable wheels of said vehicle, rotary motion of said pinion gear axially driving said steering member to turn said steerable wheels;

torsion sensing means for producing an electric signal having a value which varies as a function of the amount of input torque applied to said steering wheel;

speed sensing means for sensing the speed of the vehicle and for generating an electric signal indicative thereof;

an electric power assist motor drivably connected to at least one of said input shaft, said pinion gear or said steering member for, when actuated, assisting movement thereof, the amount of assist being directly related to applied electrical energy;

an alternator drivably connectable to the vehicle engine and including a field coil and an output coil, for, when driven, outputting electrical energy from said output coil directly related to the electrical current through said field coil;

electronic control means connected to said torsion sensing means, said speed sensing means, and connectable to said alternator field coil for generating an electrical control signal to said field coil responsive to said torque signal and said speed signal;

first switching means for connecting electrical power across said electric power assist motor in a direction responsive to the direction of applied steering torque to the vehicle steering wheel; and second switching means connected to the output coil of said alternator, to said first switching means, to a storage battery of the vehicle and controlled by said electronic control means for selectively connecting the alternator output to the battery or to the first switching means in response to sensed torque and sensed vehicle speed.

11. The apparatus of claim 10 further including third switching means connected to said battery and to said first switching means and controlled by said electronic control means and wherein said steering apparatus further includes current sensing means connected to the output of said alternator and to said electronic control means for generating an electrical signal indicative of the alternator output current, said electronic control means causing said third switching means to connect said battery to said first switching means if the output current of said alternator is less than a predetermined value.

12. The apparatus of claim 10 further including secondary drive means connected to the vehicle battery for providing a secondary source of electrical power to drive said electric assist motor, current sensing means connected to the output of said alternator and to said electronic control means for generating an electrical signal indicative of the alternator output current, and a third switching means connected to said secondary drive means and to said first switching means and controlled by said electronic control means, said electronic control means causing said third switching means to connect said secondary drive means to said first switching means when sensed alternator current is less than a predetermined value and controlling the electrical power from the secondary drive means responsive to sensed steering torque and sensed vehicle speed.

13. A steering apparatus for turning the steerable wheels of a vehicle upon rotation of the vehicle steering wheel, said apparatus comprising:
   means for mechanically coupling the vehicle steering wheel with the steerable wheels of the vehicle including, an input shaft connected to said steering wheel for rotation therewith, a pinion gear, a torsion member resiliently connecting said input shaft to said pinion gear, and a steering member having rack teeth thereon drivingly engaged by said pinion gear and connected to said steerable wheels of said vehicle, rotary motion of said pinion gear axially driving said steering member to turn said steerable wheels,
   torsion sensing means for producing an electric signal having a value which varies as a function of the amount of input torque applied to said steering wheel;
   speed sensing means for sensing the speed of the vehicle and for generating an electric signal indicative thereof;
   an electric power assist motor drivably connected to at least one of said input shaft, said pinion gear of said steering member for, when actuated, assisting movement thereof, the amount of assist being functionally related to applied electrical energy;
   an alternator drivably connectable to the vehicle engine and including a field coil and an output coil, for, when driven, outputting electrical energy from said output coil as a function of the electrical current through said field coil;
   voltage regulator means operatively connectable to the output coil of the alternator and to the alternator field coil for controlling the alternator output voltage to a predetermined charging level;
   electronic control means connected to said torsion sensing means, said speed sensing means, and connectable to said alternator field coil for generating an electrical control signal to said field coil responsive to said torque signal and said speed signal;
   first switching means for connecting electrical power across said electrical power assist motor in a direction responsive to the direction of applied steering toque to the vehicle steering wheel;
   second switching means connected to the output coil of said alternator, to said first switching means, and to a storage battery of the vehicle and controlled by said electronic control means for selectively connecting the alternator output to the battery or to the first switching means in response to sensed torque and sensed vehicle speed; and
   third switching means connected to said alternator field coil, to said voltage regulator means and to said electronic control means for selectively connecting said alternator field coil to said voltage regulator means to said electronic control means in response to sensed torque and sensed vehicle speed.

14. The steering apparatus of claim 13 further including a current sensing means connected to the alternator output coil and to said electronic control means for generating an electrical signal indicative of the alternator output current, and fourth switching means connected the vehicle battery and to the first switching means and controlled by said electronic control means to connect said battery to said first swtiching means when the alternator output current is less than a predetermined value.

15. The steering apparatus of claim 14 further including fifth switching means connected to said first switching means and a power modulator connected to the fifth switching means and to the vehicle battery and controlled by the electronic control means, said fifth switching means operatively connecting said power modulator to said first switching means when the alternator output voltage is less than said predetermined minimum value.

16. The steering apparatus of claim 15 wherein said electronic control means includes a pulse width modulator connected to said power modulator to control current through said electric power assist motor responsive to applied steering torque and sensed vehicle speed.

* * * * *